United States Patent
Novlan et al.

(10) Patent No.: US 12,177,934 B2
(45) Date of Patent: Dec. 24, 2024

(54) USER ASSOCIATION FOR INTEGRATED ACCESS AND BACKHAUL FOR 5G OR OTHER NEXT GENERATION NETWORK

(71) Applicant: AT&T Intellectual Property I, L.P., Atlanta, GA (US)

(72) Inventors: Thomas Novlan, Cedar Park, TX (US); Arunabha Ghosh, Austin, TX (US); Milap Majmundar, Austin, TX (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 429 days.

(21) Appl. No.: 16/523,110

(22) Filed: Jul. 26, 2019

(65) Prior Publication Data

US 2021/0029533 A1  Jan. 28, 2021

(51) Int. Cl.
*H04W 8/22* (2009.01)
*H04W 48/16* (2009.01)
*H04W 48/20* (2009.01)

(52) U.S. Cl.
CPC ............. *H04W 8/22* (2013.01); *H04W 48/16* (2013.01); *H04W 48/20* (2013.01)

(58) Field of Classification Search
CPC ........ H04W 8/22; H04W 48/20; H04W 48/16
See application file for complete search history.

(56) References Cited

U.S. PATENT DOCUMENTS

| | | | | |
|---|---|---|---|---|
| 10,645,616 | B2* | 5/2020 | Bhattacharjee | H04L 41/0896 |
| 2006/0080417 | A1* | 4/2006 | Boutboul | H04L 41/12 |
| | | | | 709/220 |
| 2009/0034433 | A1* | 2/2009 | Chegaray | H04W 84/18 |
| | | | | 370/255 |
| 2009/0185527 | A1* | 7/2009 | Akhtar | H04W 28/12 |
| | | | | 370/329 |
| 2015/0141013 | A1* | 5/2015 | Cui | H04W 48/20 |
| | | | | 455/436 |
| 2015/0341939 | A1* | 11/2015 | Sharma | H04W 72/542 |
| | | | | 370/329 |
| 2016/0095081 | A1* | 3/2016 | Sullivan | H04W 64/00 |
| | | | | 370/254 |
| 2017/0127468 | A1* | 5/2017 | Saikusa | H04W 76/19 |
| 2017/0238362 | A1* | 8/2017 | Karandikar | H04W 88/16 |
| | | | | 370/328 |
| 2018/0013658 | A1* | 1/2018 | Wiesmaier | H04L 41/12 |

(Continued)

OTHER PUBLICATIONS

3rd Generation Partnership Project, et al. "3GPP TR 38.874 V16.0.0, Study on Integrated Access and Backhaul." 3GPP. 2018. 111 pages.

*Primary Examiner* — Derrick W Ferris
*Assistant Examiner* — Sumitra Ganguly
(74) *Attorney, Agent, or Firm* — GUNTIN & GUST, PLC; Miyoung Shin

(57) ABSTRACT

In a 5G network, control unit (CU) can be connected to a radio access network controller (RC). In response to receiving measurement data from the CU, the RC can process the measurement data to determine polices and procedures related to radio resource management, and/or radio resource control, which can then be utilized to manage mobility, dual-connectivity, carrier aggregation, and/or integrated access and backhaul topology formation and routing. The measurement data provided by the CU can be provided directly to the RC without processing of the measurement data by the CU.

20 Claims, 12 Drawing Sheets

(56) References Cited

U.S. PATENT DOCUMENTS

| | | | |
|---|---|---|---|
| 2019/0109732 A1* | 4/2019 | Choi | H04L 5/0051 |
| 2019/0150220 A1* | 5/2019 | Byun | H04W 76/11 |
| | | | 370/329 |
| 2019/0215055 A1* | 7/2019 | Majmundar | H04W 40/22 |
| 2019/0327660 A1* | 10/2019 | Hong | H04L 5/0048 |
| 2019/0387546 A1* | 12/2019 | Li | H04L 27/26132 |
| 2020/0045563 A1* | 2/2020 | Luo | H04W 52/367 |
| 2020/0154339 A1* | 5/2020 | Singh | H04L 45/02 |
| 2022/0038994 A1* | 2/2022 | Wei | H04W 40/22 |

* cited by examiner

USER ASSOCIATION FOR INTEGRATED ACCESS AND BACKHAUL FOR 5G OR OTHER NEXT GENERATION NETWORK

TECHNICAL FIELD

This disclosure relates generally to facilitating user association for integrated access and backhaul. For example, this disclosure relates to facilitating user association via a radio access network controller for a 5G, or other next generation network, air interface.

BACKGROUND

5th generation (5G) wireless systems represent a next major phase of mobile telecommunications standards beyond the current telecommunications standards of $4^{th}$ generation (4G). Rather than faster peak Internet connection speeds, 5G planning aims at higher capacity than current 4G, allowing a higher number of mobile broadband users per area unit, and allowing consumption of higher or unlimited data quantities. This would enable a large portion of the population to stream high-definition media many hours per day with their mobile devices, when out of reach of wireless fidelity hotspots. 5G research and development also aims at improved support of machine-to-machine communication, also known as the Internet of things, aiming at lower cost, lower battery consumption, and lower latency than 4G equipment.

The above-described background relating to facilitating user association via a radio access network controller is merely intended to provide a contextual overview of some current issues, and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
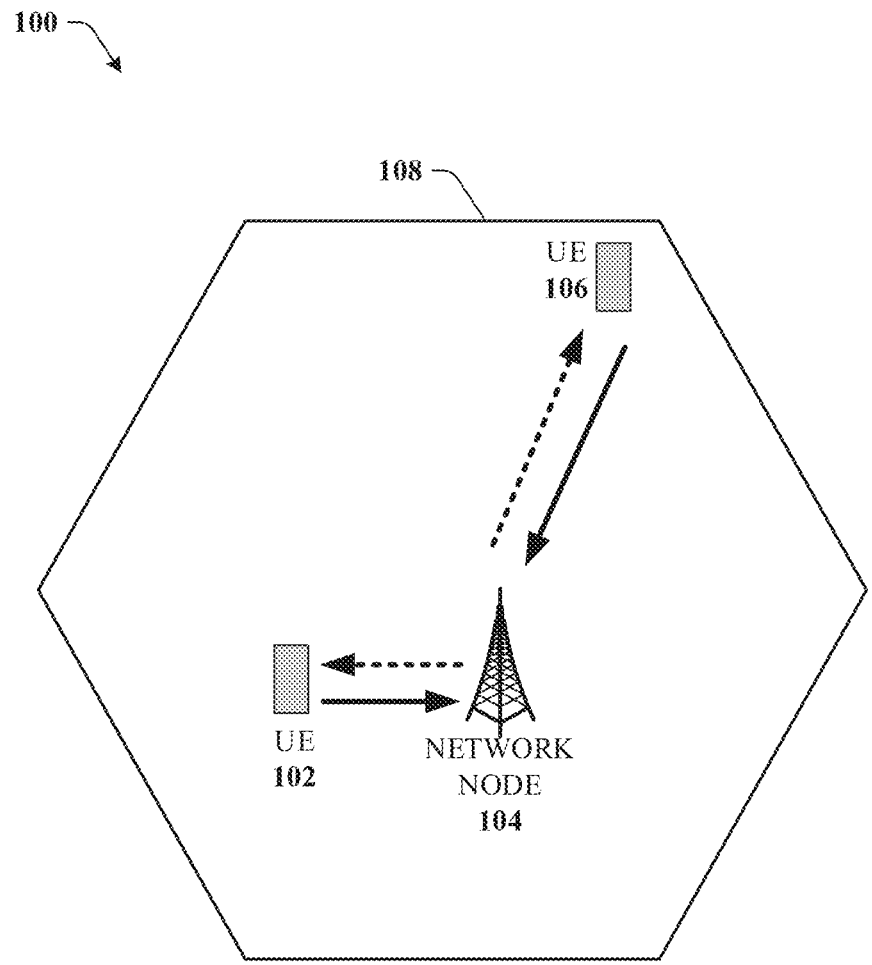
FIG. 1 illustrates an example wireless communication system in which a network node device (e.g., network node) and user equipment (UE) can implement various aspects and embodiments of the subject disclosure.

In the following description, numerous specific details are set forth to provide a thorough understanding of various embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various machine-readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The words "exemplary" and/or "demonstrative" are used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, or machine-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As an overview, various embodiments are described herein to facilitate user association via a radio access network controller for a 5G air interface or other next generation networks. For simplicity of explanation, the methods (or algorithms) are depicted and described as a series of acts. It is to be understood and appreciated that the various embodiments are not limited by the acts illustrated and/or by the order of acts. For example, acts can occur in various orders and/or concurrently, and with other acts not presented or described herein. Furthermore, not all illustrated acts may be required to implement the methods. In addition, the methods could alternatively be represented as a series of interrelated states via a state diagram or events. Additionally, the methods described hereafter are capable of being stored on an article of manufacture (e.g., a machine-readable storage medium) to facilitate transporting and transferring such methodologies to computers. The term article of manufacture, as used herein, is intended to encompass a computer program accessible from any computer-readable device, carrier, or media, including a non-transitory machine-readable storage medium.

It should be noted that although various aspects and embodiments have been described herein in the context of 5G, Universal Mobile Telecommunications System (UMTS), and/or Long Term Evolution (LTE), or other next generation networks, the disclosed aspects are not limited to 5G, a UMTS implementation, and/or an LTE implementation as the techniques can also be applied in 3G, 4G or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

Described herein are systems, methods, articles of manufacture, and other embodiments or implementations that can facilitate user association via a radio access network controller for a 5G network. Facilitating user association via a radio access network controller for a 5G network can be implemented in connection with any type of device with a connection to the communications network (e.g., a mobile handset, a computer, a handheld device, etc.) any Internet of things (TOT) device (e.g., toaster, coffee maker, blinds, music players, speakers, etc.), and/or any connected vehicles (cars, airplanes, space rockets, and/or other at least partially automated vehicles (e.g., drones)). In some embodiments the non-limiting term user equipment (UE) is used. It can refer to any type of wireless device that communicates with a radio network node in a cellular or mobile communication system. Examples of UE are target device, device to device (D2D) UE, machine type UE or UE capable of machine to machine (M2M) communication, PDA, Tablet, mobile terminals, smart phone, laptop embedded equipped (LEE), laptop mounted equipment (LME), USB dongles etc. Note that the terms element, elements and antenna ports can be interchangeably used but carry the same meaning in this disclosure. The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception.

In some embodiments the non-limiting term radio network node or simply network node is used. It can refer to any type of network node that serves UE is connected to other network nodes or network elements or any radio node from where UE receives a signal. Examples of radio network nodes are Node B, base station (BS), multi-standard radio (MSR) node such as MSR BS, eNode B, network controller, radio network controller (RNC), base station controller (BSC), relay, donor node controlling relay, base transceiver station (BTS), access point (AP), transmission points, transmission nodes, RRU, RRH, nodes in distributed antenna system (DAS) etc.

Cloud radio access networks (RAN) can enable the implementation of concepts such as software-defined network (SDN) and network function virtualization (NFV) in 5G networks. This disclosure can facilitate a generic channel state information framework design for a 5G network. Certain embodiments of this disclosure can comprise an SDN controller that can control routing of traffic within the network and between the network and traffic destinations. The SDN controller can be merged with the 5G network architecture to enable service deliveries via open application programming interfaces ("APIs") and move the network core towards an all internet protocol ("IP"), cloud based, and software driven telecommunications network. The SDN controller can work with, or take the place of policy and charging rules function ("PCRF") network elements so that policies such as quality of service and traffic management and routing can be synchronized and managed end to end.

To meet the huge demand for data centric applications, 4G standards can be applied 5G, also called new radio (NR) access. 5G networks can comprise the following: data rates of several tens of megabits per second supported for tens of thousands of users; 1 gigabit per second can be offered simultaneously to tens of workers on the same office floor; several hundreds of thousands of simultaneous connections can be supported for massive sensor deployments; spectral efficiency can be enhanced compared to 4G; improved coverage; enhanced signaling efficiency; and reduced latency compared to LTE. In multicarrier system such as OFDM, each subcarrier can occupy bandwidth (e.g., subcarrier spacing). If the carriers use the same bandwidth spacing, then it can be considered a single numerology. However, if the carriers occupy different bandwidth and/or spacing, then it can be considered a multiple numerology.

A centralized unit (CU) can be connected to a radio access network (RAN) controller (RC). The RC can be provided with measurements, metrics, and other analytics (e.g., counters, statistics, messages) from the CU, which can be then processed by the RC using optimization, machine learning, and/or other tools to determine policies and procedures related to radio resource management (RRM), radio resource control (RRC), which can be used to manage mobility, dual-connectivity, carrier aggregation, and integrated access and backhaul (IAB) topology formation and routing. The measurements and other information from the CU can be provided directly without processing at the CU, or can be aggregated, refined, and filtered at the CU first to reduce the signaling volume and simplify the processing at the RC. The RC can be physically separated or co-located with other RAN equipment including the CU (CU-user plane (UP) and/or CU-control plane (CP)). The RC can also be a logical entity, which can be virtualized to run on different hardware platforms in a flexible manner. The interface between the CU and RC can be implemented according to a standardized open interface (e.g., E2 interface) or over a proprietary interface with vendor/operator specific application protocol interfaces (APIs) defined to exchange the required information between the CU and RC according to the scenarios and algorithms supported. In addition, the RAN controller can contain or interface with the operations, administration, and maintenance (OAM) functionality of the network in order to create appropriate policies and/or corresponding configurations for various nodes in the network including the donor unit (DU)/UE functionality of IAB nodes and IAB donor DUs and CUs.

The following sections describe different scenarios where the RC can be used to optimize user association by directly or indirectly influencing or controlling operations of the network nodes and underlying protocol layers, especially procedures involving cell selection and mobility procedures. The RC can have control plane connectivity to different network nodes including access UEs, IAB nodes, and IAB donors. In addition, the RC can obtain measurements and analytics from the CU, while providing policies related to user association and mobility for implementation in the network.

During, phase 1, an IAB-node mobile termination (MT) part can perform the connection setup procedure and authentication via LTE RRC signaling to the LTE network in case of non-standalone (NSA) operation, or via NR RRC signaling to the NR network in case of standalone (SA) operation. Typically, the user association can be made on the basis of radio measurements (e.g., max RSRP of the measured candidate cells). However, while the measurement reports indicate suitable gNBs from an access perspective, connectivity for IAB nodes can also be based on topology considerations, including whether the target gNB supports IAB functionality.

Since not all gNBs deployed in the coverage of a newly powered-on IAB node have IAB functionality, the IAB node MT function can identify potential candidate parent nodes before establishing connectivity between the IAB node and its target parent IAB node or donor node via a cell selection procedure in case of SA operation or SN addition in case of NSA operation. To minimize the impact of deploying IAB, the impact on the LTE eNBs, NR gNBs and CN functions can be minimized, so explicit indication of which target gNBs support IAB functionality and the underlying topology may not be derived by the RAN nodes themselves, but by a RAN or OAM controller instead.

In one embodiment, the RC can obtain information about the capability of currently operating gNB-DU, which are either IAB nodes or IAB donors and non-IAB supporting gNB DUs in a given area and create a list of nodes, which can or cannot serve as candidate parent nodes for newly active IAB nodes. In another embodiment, the list of gNB-DUs can be a whitelist (e.g., a list of candidate parents) or blacklist (e.g., a list of nodes which should be excluded as parents). In another embodiment, the list of candidate gNB-DUs can be derived based on geographical information, for example, a list of gNB-DU IDs, which are within a 1 mile radius of the powering-on IAB node. In yet another embodiment, the list of candidate gNB-DUs can be derived based on connectivity to a common CU or CN instance. In yet another embodiment, the candidate gNB-DUs can be listed according to supported IAB functionality and topology information. For example, the list can comprise information about hop-order of the IAB nodes from a donor node, along with information about which gNB-DUs are serving as intermediate nodes along the route(s) between the candidate gNB-DU and the donor node (if any). In another example, the list can comprise information about the supported access and backhaul multiplexing functionality including time-division multiplexing (TDM), frequency-division multiplexing (FDM), space-division multiplexing (SDM), and/or full-duplex. In yet another example, the list can comprise the support backhaul and access throughput, beamforming capabilities, and/or support for advanced services such as ultra-reliable low-latency communication (URLLC), vehicle to everything (V2X) services, non-NR based connectivity (e.g., LTE or Wi-Fi backhaul), or CN-less connectivity (e.g., local breakout).

The information regarding candidate nodes can be provided to the gNB-CU-CP and IAB MTs performing initial access via NR RRC container messages. For example, after initial access on a given NR frequency layer, the gNB-CU can change the cell association depending on whether the UE is an access device or IAB MT (e.g., only considers cells belonging to IAB nodes or donors) based on the policies and list of candidate nodes provided by the RC/OAM. In other embodiments, the list of candidates can be provided to the MTs directly by a dedicated system information broadcast message or can be hardcoded or provided by another application layer signaling message. The RC/OAM controller can periodically update the lists of candidate nodes based on information from the RAN nodes such as: topology updates, loading information, network performance metrics, and/or other service-level criteria.

Access UEs ac connected to the network by performing initial access procedures (e.g. synchronization signal detection and random access procedure) to associate with an NR cells. The initial access procedure can be enhanced to support awareness of an IAB deployment and architecture. For example, an IAB node's hop-order can be factored into cell selection decisions on top of RRM measurements, which can be beneficial when considering end-to-end latency of the access traffic, which traverses multiple hops compared to a direct connection to a donor node, which can have lower RSRP compared to the IAB node. Two different types of access UE association enhancements can be considered: topology aware and service aware.

With regards to topology aware, depending on the number of connected child IAB nodes and access UEs, the donor nodes can be very congested in terms of both control signaling overhead and data plane scheduling capabilities. In this case, certain cell association biases, which can spread UEs across different branches of the topology can improve performance better than only RSRP-based association. In one alternative, this can be an explicit indication of cell IDs, which are white or blacklisted for a given UE or set of UEs. In another alternative, a cell-specific, UE-specific, or network node specific (e.g. applied only to IAB nodes or IAB donors) bias to the measured RRM quantities used for selection. In a third alternative, a cell-barring indication can be provided depending on whether a cell is an IAB node or IAB donor node to prevent additional UE association or camping on a given cell depending on the policy communicated to the CU-CP by the RC/OAM controller.

With regards to service-aware, the user association policy determined by the RC/OAM controller can be additionally based on a given UE's service-level such as URLLC, V2X, or enhanced mobile broadband (eMBB). For example, the network can bias the URLLC UE towards a lower hop order (closer to the donor), and bias an eMBB-only UE towards higher hop order since it does not have as stringent of a latency requirement. In case multiple services are supported, the cell association can be based on the most stringent requirements of the different services, or which service is currently active for a given UE. Enforcement of the different methods can be done by the CU-CP by initiating mobility procedures based on policies from ONAP/OAM. In another example, system information broadcast signaling can be used to support IDLE mode cell selection. In addition, different cell-bias values/policies can be provided for the IAB MTs directly (when powering on) via IAB-specific broadcast signaling compared to access UEs.

In one embodiment, described herein is a method comprising receiving, by a wireless network device comprising a processor, capability data representative of a capability of a candidate node device of a wireless network. In response to the receiving the capability data, the method can comprise, determining, by the wireless network device, whether the candidate node device is a parent node device to be used for connectivity with a node device. Additionally, in response to a condition associated with the determining being determined to have been satisfied, the method can comprise generating, by the wireless network device, a data structure that comprises data representative of the parent node device and the capability of the parent node device.

According to another embodiment, a system can facilitate, obtaining capability data representative of a capability of a candidate node device of a wireless network. In response to the obtaining the capability data, the system operations can comprise determining whether the candidate node device is a parent node device usable to connect to a mobile device. Furthermore, in response to a condition associated with a service level of the mobile device being determined to have been satisfied, the system operations can comprise generating a data structure that comprises the parent node device and the capability of the parent node device.

According to yet another embodiment, described herein is a machine-readable storage medium that can perform the operations comprising accessing capability data representative of capabilities of candidate node devices of a wireless network. Based on the capability data, the machine-readable storage medium can perform the operations comprising selecting a candidate node device, of the candidate node devices, to be used to connect to a mobile device. Furthermore, in response to a condition associated with a service level of the mobile device being determined to have been satisfied, the machine-readable storage medium can perform the operations comprising generating a data structure that comprises the candidate node device and the capabilities of the candidate node device.

These and other embodiments or implementations are described in more detail below with reference to the drawings.

Referring now to FIG. 1, illustrated is an example wireless communication system 100 in accordance with various aspects and embodiments of the subject disclosure. In one or more embodiments, system 100 can comprise one or more user equipment UEs 102. The non-limiting term user equipment can refer to any type of device that can communicate with a network node in a cellular or mobile communication system. A UE can have one or more antenna panels having vertical and horizontal elements. Examples of a UE comprise a target device, device to device (D2D) UE, machine type UE or UE capable of machine to machine (M2M) communications, personal digital assistant (PDA), tablet, mobile terminals, smart phone, laptop mounted equipment (LME), universal serial bus (USB) dongles enabled for mobile communications, a computer having mobile capabilities, a mobile device such as cellular phone, a laptop having laptop embedded equipment (LEE, such as a mobile broadband adapter), a tablet computer having a mobile broadband adapter, a wearable device, a virtual reality (VR) device, a heads-up display (HUD) device, a smart car, a machine-type communication (MTC) device, and the like. User equipment UE 102 can also comprise IOT devices that communicate wirelessly.

In various embodiments, system 100 is or comprises a wireless communication network serviced by one or more wireless communication network providers. In example embodiments, a UE 102 can be communicatively coupled to the wireless communication network via a network node 104. The network node (e.g., network node device) can communicate with user equipment (UE), thus providing connectivity between the UE and the wider cellular network. The UE 102 can send transmission type recommendation data to the network node 104. The transmission type recommendation data can comprise a recommendation to transmit data via a closed loop MIMO mode and/or a rank-1 precoder mode.

A network node can have a cabinet and other protected enclosures, an antenna mast, and multiple antennas for performing various transmission operations (e.g., MIMO operations). Network nodes can serve several cells, also called sectors, depending on the configuration and type of antenna. In example embodiments, the UE 102 can send and/or receive communication data via a wireless link to the network node 104. The dashed arrow lines from the network node 104 to the UE 102 represent downlink (DL) communications and the solid arrow lines from the UE 102 to the network nodes 104 represents an uplink (UL) communication.

System 100 can further include one or more communication service provider networks 106 that facilitate providing wireless communication services to various UEs, including UE 102, via the network node 104 and/or various additional network devices (not shown) included in the one or more communication service provider networks 106. The one or more communication service provider networks 106 can include various types of disparate networks, including but not limited to: cellular networks, femto networks, picocell networks, microcell networks, internet protocol (IP) networks Wi-Fi service networks, broadband service network, enterprise networks, cloud based networks, and the like. For example, in at least one implementation, system 100 can be or include a large scale wireless communication network that spans various geographic areas. According to this implementation, the one or more communication service provider networks 106 can be or include the wireless communication network and/or various additional devices and components of the wireless communication network (e.g., additional network devices and cell, additional UEs, network server devices, etc.). The network node 104 can be connected to the one or more communication service provider networks 106 via one or more backhaul links 108. For example, the one or more backhaul links 108 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also include wireless link components, such as but not limited to, line-of-sight (LOS) or non-LOS links which can include terrestrial air-interfaces or deep space links (e.g., satellite communication links for navigation).

Wireless communication system 100 can employ various cellular systems, technologies, and modulation modes to facilitate wireless radio communications between devices (e.g., the UE 102 and the network node 104). While example embodiments might be described for 5G new radio (NR) systems, the embodiments can be applicable to any radio access technology (RAT) or multi-RAT system where the UE operates using multiple carriers e.g. LTE FDD/TDD, GSM/GERAN, CDMA2000 etc.

For example, system 100 can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices (e.g., the UEs 102 and the network device 104) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, system 100 can be configured to provide and employ 5G wireless networking features and functionalities. 5G wireless communication networks are expected to fulfill the demand of exponentially increasing data traffic and to allow people and machines to enjoy gigabit data rates with virtually zero latency. Compared to 4G, 5G supports more diverse traffic scenarios. For example, in addition to the various types of data communication between conventional UEs (e.g., phones, smartphones, tablets, PCs, televisions, Internet enabled televisions, etc.) supported by 4G networks, 5G networks can be employed to support data communication between smart cars in association with driverless car environments, as well as machine type communications (MTCs). Considering the drastic different communication needs of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

To meet the demand for data centric applications, features of proposed 5G networks may comprise: increased peak bit rate (e.g., 20 Gbps), larger data volume per unit area (e.g., high system spectral efficiency—for example about 3.5 times that of spectral efficiency of long term evolution (LTE) systems), high capacity that allows more device connectivity both concurrently and instantaneously, lower battery/power consumption (which reduces energy and consumption costs), better connectivity regardless of the geographic region in which a user is located, a larger numbers of devices, lower infrastructure development costs, and higher reliability of the communications. Thus, 5G networks may allow for: data rates of several tens of megabits per second should be supported for tens of thousands of users, 1 gigabit per second to be offered simultaneously to tens of workers on the same office floor, for example; several hundreds of thousands of simultaneous connections to be supported for massive sensor deployments; improved coverage, enhanced signaling efficiency; reduced latency compared to LTE.

The upcoming 5G access network may utilize higher frequencies (e.g., >6 GHz) to aid in increasing capacity. Currently, much of the millimeter wave (mmWave) spectrum, the band of spectrum between 30 gigahertz (Ghz) and 300 Ghz is underutilized. The millimeter waves have shorter wavelengths that range from 10 millimeters to 1 millimeter, and these mmWave signals experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications, and has been widely recognized a potentially important component for access networks operating in higher frequencies. MIMO can be used for achieving diversity gain, spatial multiplexing gain and beamforming gain. For these reasons, MIMO systems are an important part of the 3rd and 4th generation wireless systems, and are planned for use in 5G systems.

Figure 2:
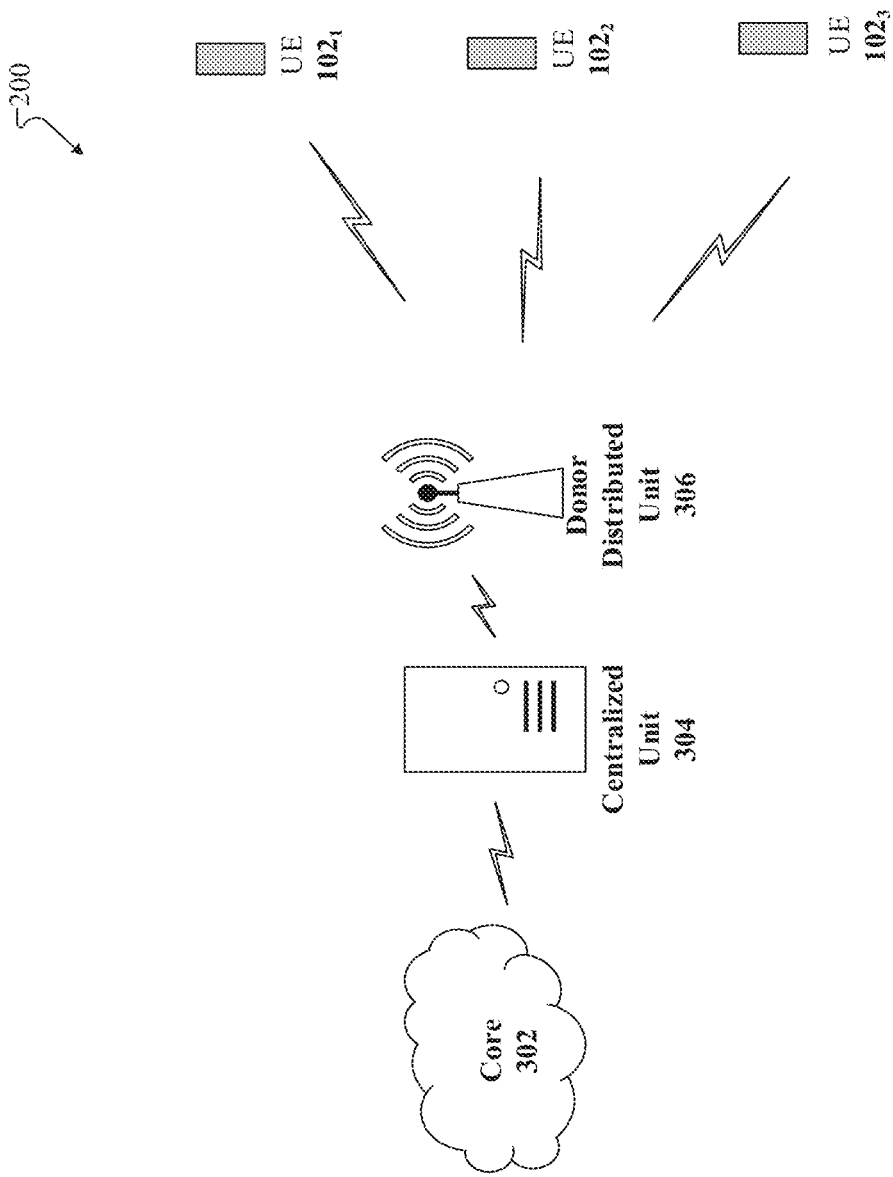
FIG. 2 illustrates an example schematic system block diagram of a new radio access architecture according to one or more embodiments.

Referring now to FIG. 2, illustrated is an example schematic system block diagram 200 of a new radio access architecture according to one or more embodiments. 3GPP NR-based 5G mobile networks can be deployed using a split RAN protocol architecture such that on the user plane the packet data convergence protocol (PDCP) sublayers can reside at a centralized unit (CU) 304, while the radio link control (RLC), media access control (MAC), and physical layer (PHY) layers can reside at the distributed unit (DU) 306. User plane data can be carried on data radio bearers (DRBs) that traverse the above described user plane RAN protocol architecture. On the control plane, signaling radio bearers (SRBs) can be set up to carry control messages from the radio resource control (RRC) layer, also utilize the packet data control protocol (PDCP) layer at the CU, and are further carry the control messages down through the RLC, medium access control (MAC), and physical (PHY) layers at the DU 306 to be delivered to the UE 102 over the air interface. Each network user can be allocated multiple DRBs and SRBs by the network. The network interface between the CU 304 and DU 306 can be called the F1 interface per 3GPP specifications.

Figure 3:
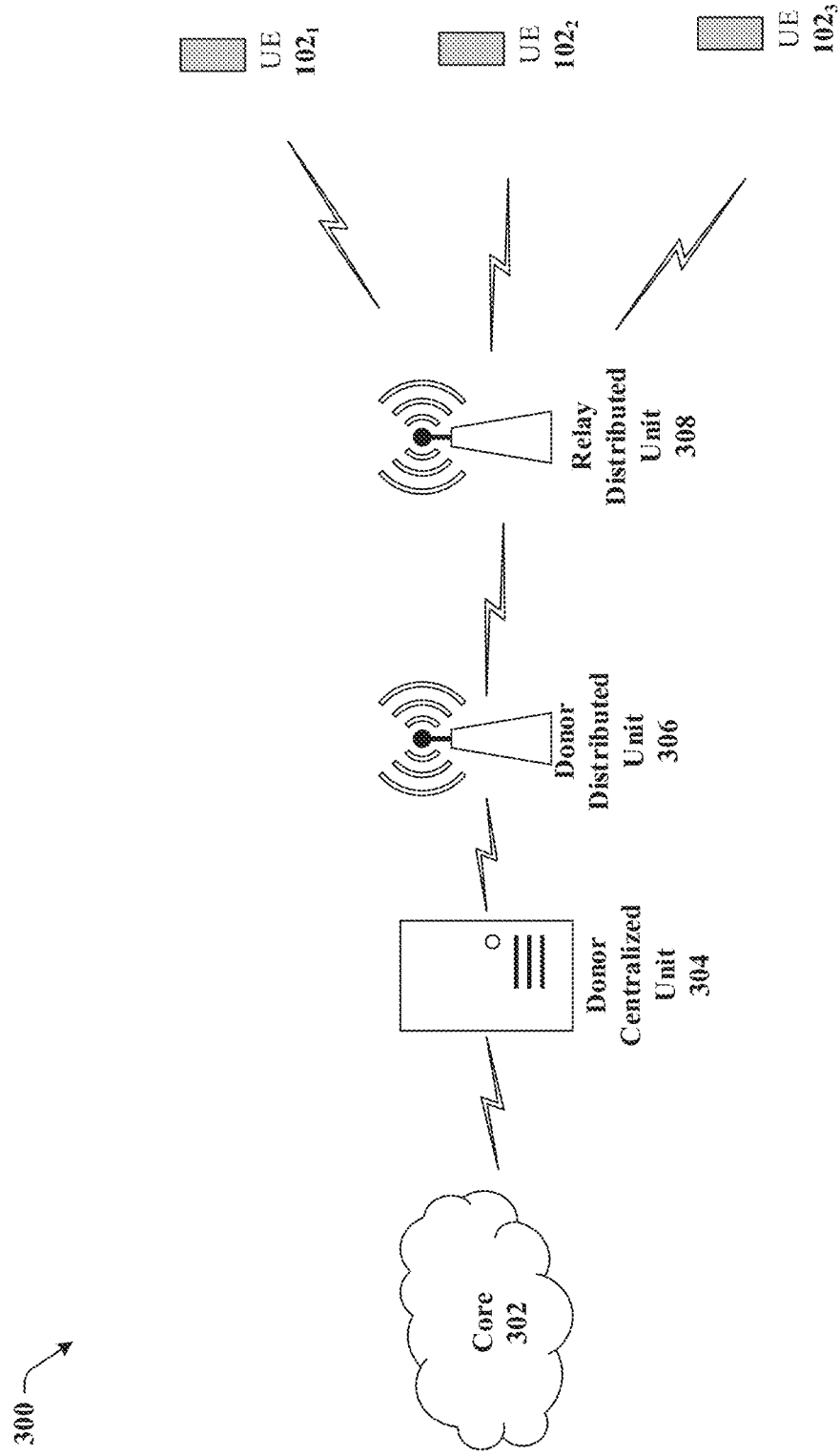
FIG. 3 illustrates an example schematic system block diagram of integrated access and backhaul links according to one or more embodiments.

Referring now to FIG. 3, illustrated is an example schematic system block diagram of integrated access and backhaul links according to one or more embodiments. An IAB feature can enable future cellular network deployment scenarios and applications to the support wireless backhaul and relay links enabling flexible and very dense deployment of NR cells without the need for densifying the transport network proportionately.

Due to the expected larger bandwidth available for NR compared to LTE (e.g., mmWave spectrum) along with the native deployment of massive MIMO or multi-beam systems in NR, IAB links can be developed and deployed. This can allow easier deployment of a dense network of self-backhauled NR cells in a more integrated manner by building upon many of the control and data channels/procedures defined for providing access to UEs.

For example, the network 300, as represented in FIG. 3 with integrated access and backhaul links, can allow a relay node to multiplex access and backhaul links in time, frequency, and/or space (e.g., beam-based operation). Thus, FIG. 3 illustrates a generic IAB set-up comprising a core network 302, a centralized unit 304, donor distributed unit 306, relay distributed unit 308, and UEs 1021, 1022, 1023. The donor distributed unit 306 (e.g., access point) can have a wired backhaul with a protocol stack and can relay the user traffic for the UEs 1021, 1022, 1023 across the IAB and backhaul link. Then the relay distributed unit 308 can take the backhaul link and convert it into different strains for the connected UEs 1021, 1022, 1023. Although FIG. 3 depicts a single hop (e.g., over the air), it should be noted that multiple backhaul hops can occur in other embodiments.

Figure 4:
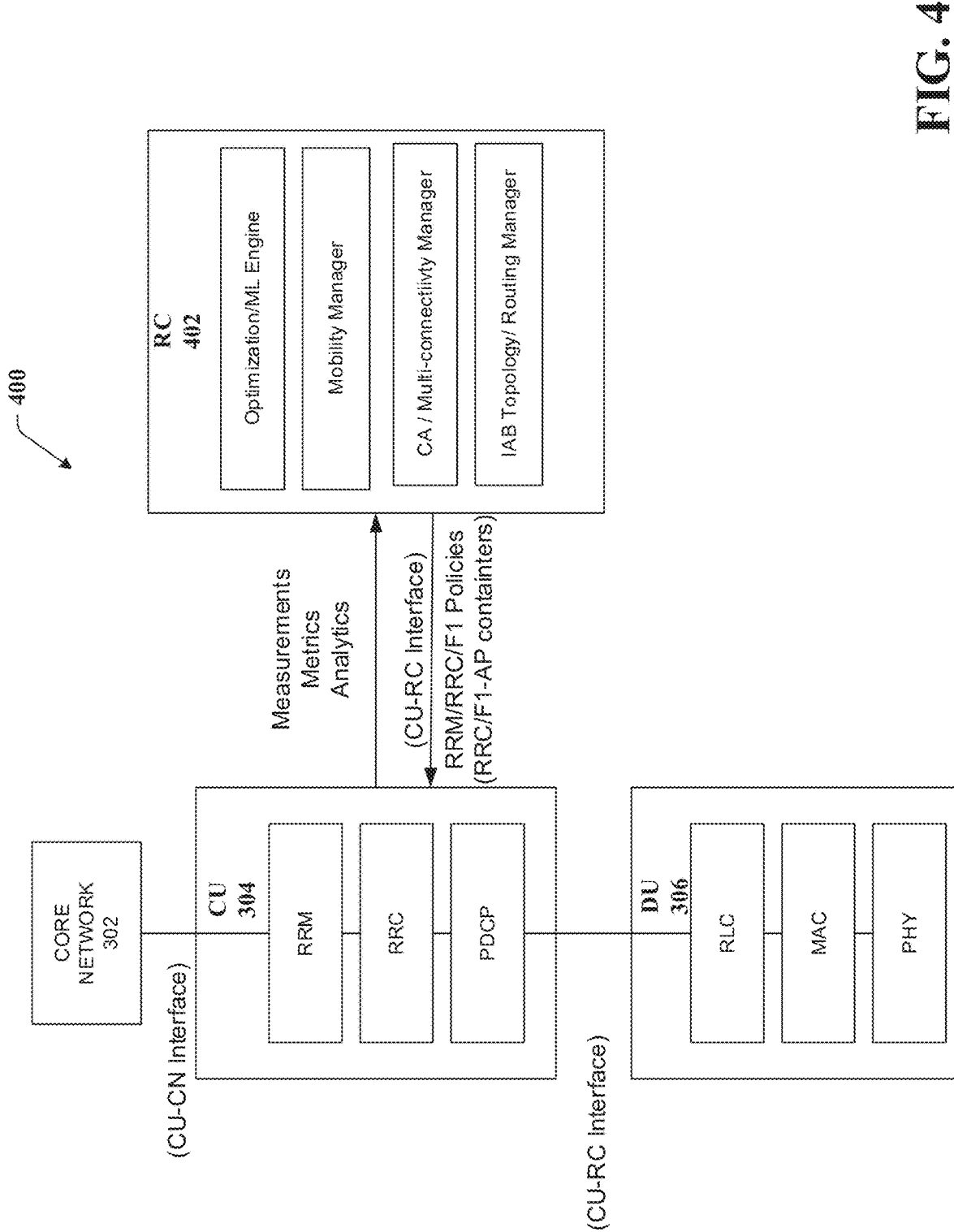
FIG. 4 illustrates an example schematic system block diagram of an example 5G architecture with a radio access network controller according to one or more embodiments.

Referring now to FIG. 4, illustrated is an example schematic system block diagram of an example 5G architecture 400 with a radio access network controller according to one or more embodiments.

A RAN controller (RC) 402 can be added to a normal RAN network to directly control the functionality of the CU 304 and/or provide the policies for the CU 304 to use. The CU 304 can then execute these functionalities. The CU 304 can provide a user association based on the data collected by the RC 402. The RC 402 can utilize machine-learning techniques to provide the data to the CU 304. The data can comprise optimization functionality, carrier aggregation functionality, mobility management functionality, and integrated access and backhaul (IAB) topology/routing management functionality. For example, the CU 304 can provide measurement metrics to the RAN controller 402 via a CU-RC interface. Based on the measurement metrics, the RAN controller 402 can control the functionality of the CU 304 and/or provide polices to the CU 304 for the CU 304 to execute.

Figure 5:
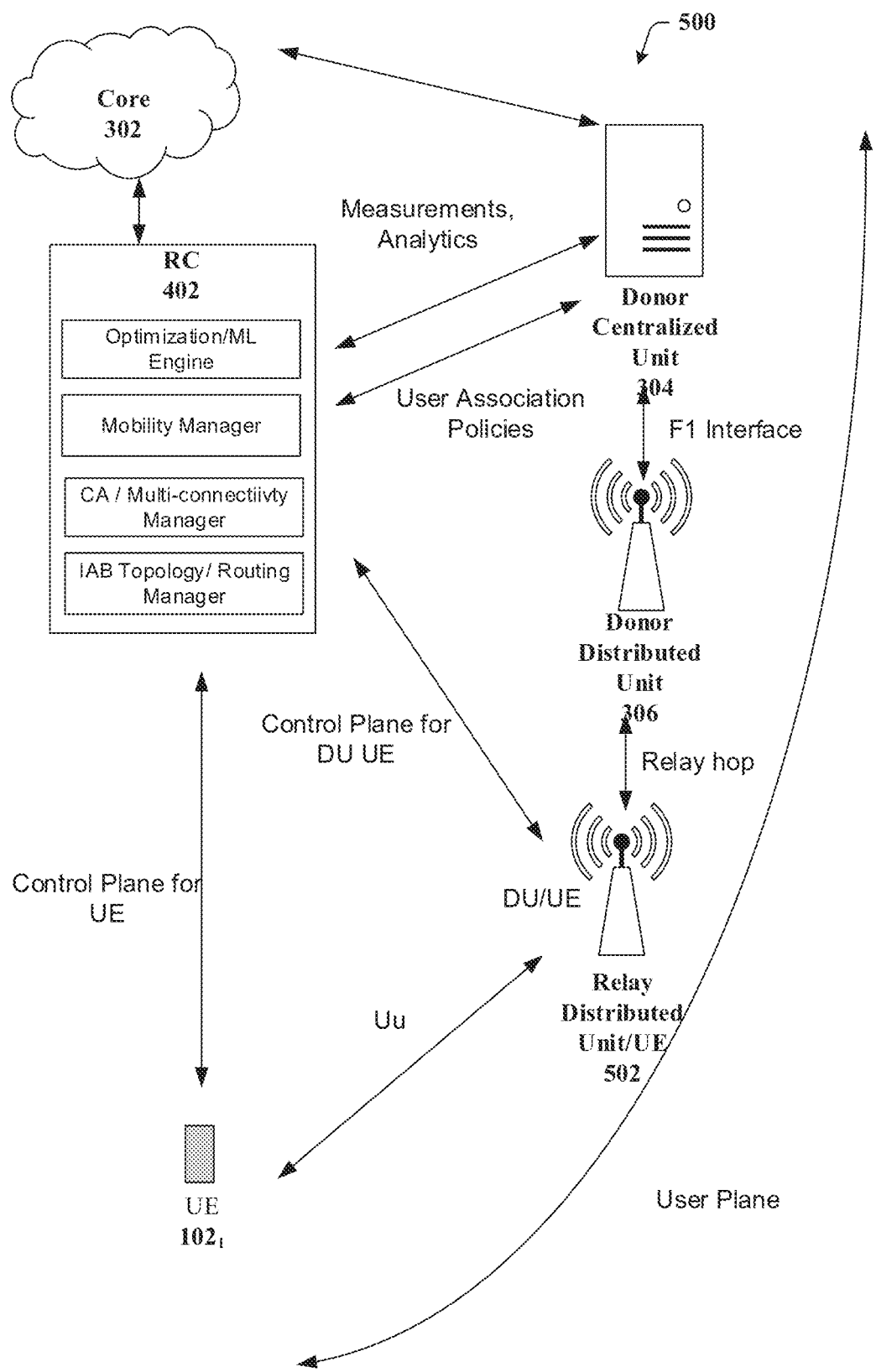
FIG. 5 illustrates an example schematic system block diagram of that depicts control plane connectivity according to one or more embodiments.

Referring now to FIG. 5 illustrates an example schematic system block diagram of that depicts control plane connectivity 500 according to one or more embodiments.

The RAN controller 402 can also determine what measurements and analytics it wants from the CU 304. It can take those measurements and analytics and determine a target user association policy for relay nodes and/or for the UEs 1021 and provide those policies back to the CU 304. Thus, when the CU 304 is assisting with the user association of the relay node, then the CU 304 can use the policies provided to by the RAN controller 402 and change the association based on more than just normal metrics. In another embodiment, the UE 1021 can change its association to a relay node or a donor node based on the policies enacted by the CU 304. Thus, different policies can be utilized depending on whether the system is managing a relay node or managing a UE and, even further, differentiating the users based on a service type.

Figure 6:
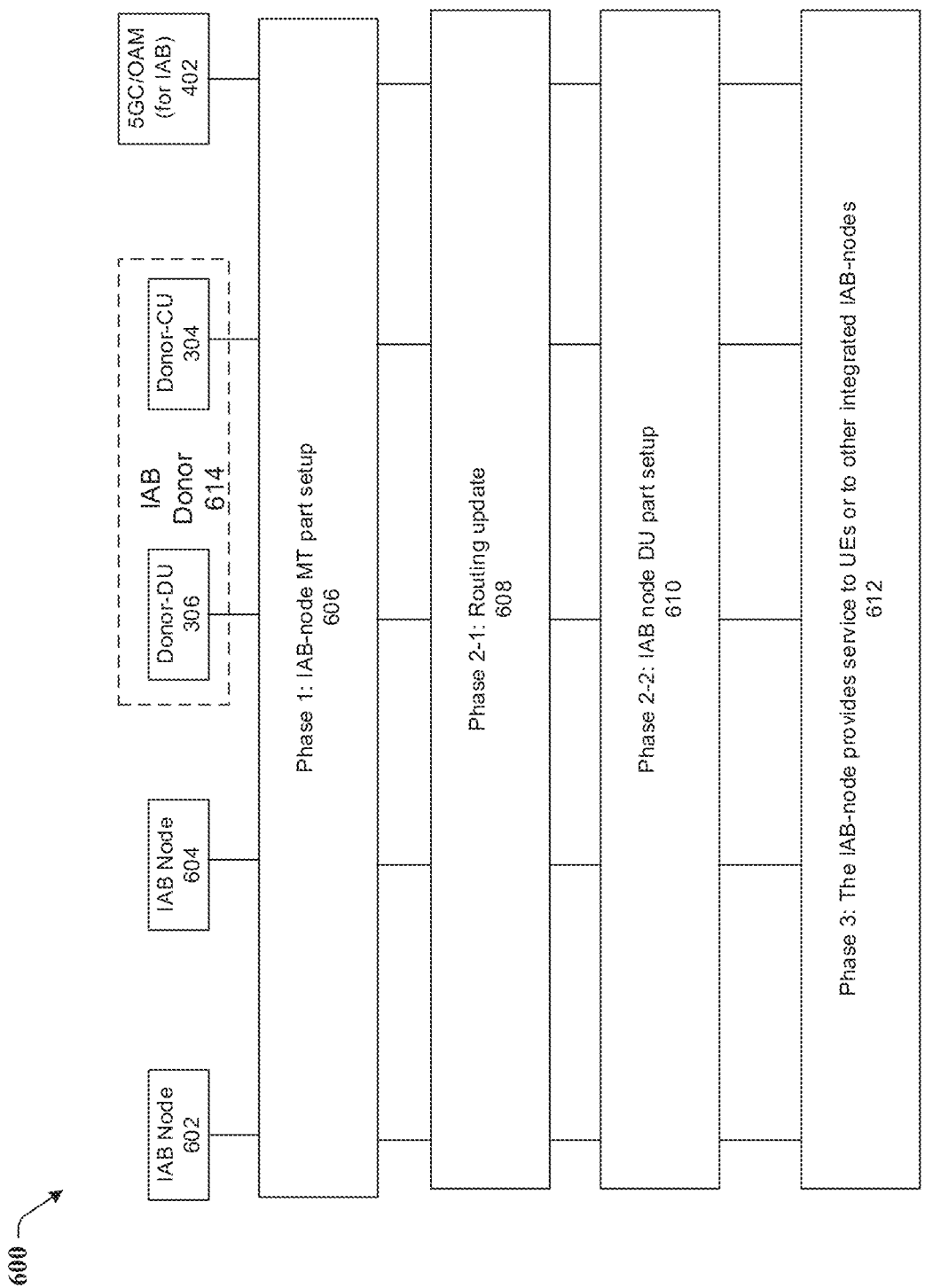
FIG. 6 illustrates an example schematic system block diagram of an integrated access backhaul integration procedure according to one or more embodiments.

Referring now to FIG. 6, illustrated is an example schematic system block diagram of an integrated access backhaul integration procedure 600 according to one or more embodiments.

The system can comprise a multiphase approach to integrate the IAB nodes into the network. The IAB nodes can connect like a regular user and just pick a cell that has the strongest reference signal received power (RSRP). However, because they are IAB nodes, there is additional functionality that can be addressed. For example, they can connect to gNBs that have IAB node functionality if they are donors or other IAB nodes. So there can be an association decision based on additional metrics beyond what a normal user would do. Thus, this can be incorporated into the user association for the IAB nodes using the mobile terminal (MT) function of the IAB nodes.

The IAB node 602 can be connecting to the network for the first time and detect IAB node 604 as a candidate parent node. The IAB node 604 can also be connected to the wired network, which is also an IAB donor 614 comprising the donor-DU 306 and the donor-CU 304. The IAB donor 614 is where the wireless backhaul ends and there is a wired connection to the network, which is where the donor CU 306 that handles the user association can be located. Additionally, there can be a connection to an OAM server that manages the policies where the RAN controller 402 can be. Thus, there can be different phases across the network where the signaling is propagating back and forth between IAB nodes to setup the IAB node 602. Eventually, the IAB node 602 can begin serving traffic, connecting users, and/or connecting other IAB nodes. Therefore, the MT part (e.g., the UE-like functionality of the IAB node) of the IAB node 602 can connect in phase 1 and then be followed by the DU part connection serving other users once it is actually activated. User association based on the IAB node MT setup can be a first step (phase 1) 606, followed by backhauling at a second step 608, via a routing update (phase 2-1), followed by setup of the IAB node DU part (phase 2-2) at stop 610 prior to the IAB node providing service to UEs and/or other IABs (phase 3) at step 612.

There can be benefits for putting UEs on IAB nodes or non-IAB nodes. For example, when there are a large number of hops that can increase latency and a large number of users that can increase the backhauling load, the number of UEs can be reduced to decrease latency. In another embodiment, UEs can be placed on nodes with a small hop order and/or nodes that are directly connected to the donor node to reduce latency. This can be performed in a general policy and/or the service that the UE requires can be utilized to determine how the system should function. For example, if a UE has a basic eMBB Internet traffic, then the UE may not need to be biased to the donor node. However if the UE has a strict latency requirement (e.g., URLLC), then this can be taken into account and force the donor to put that UE on an IAB node with a lower hop order or with the donor itself.

Figure 7:
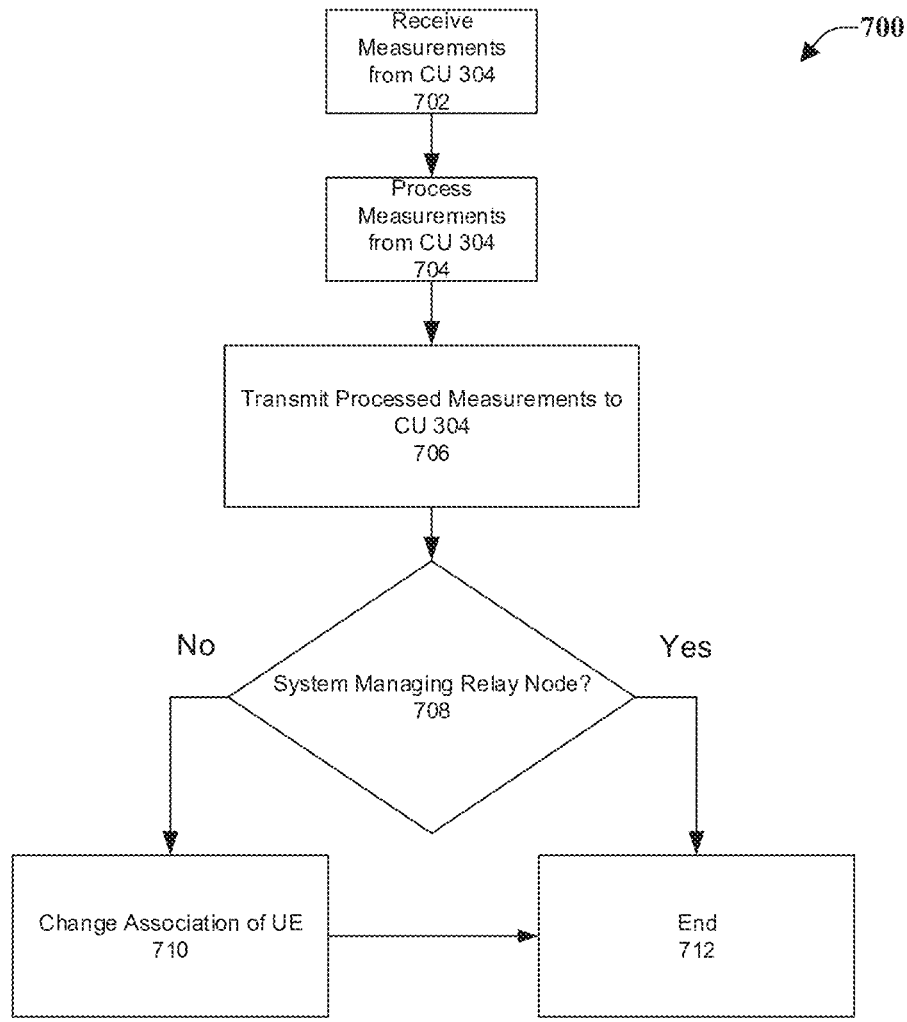
FIG. 7 illustrates an example schematic system block diagram of user association according to one or more embodiments.

Referring now to FIG. 7, illustrated is an example schematic system flow diagram of user association 700 according to one or more embodiments.

At element 702, the RC 402 can receive measurement data from the CU 304. The measurement data can be requested by the RC 402 and/or, sent directly from the CU 304. After the RC 402 has received the measurement data from the CU 304, the RC 402 can process the measurement data in accordance with a machine learning engine, a mobility manager, a multi-connectivity manager, and/or a topology/routing manager at element 704. At element 706, the RC 402 can transmit the processed data back to the CU 304. Based on whether the system is managing a relay node or a UE at element 708, a determination can be made as to how the CU 304 directs the relay node and/or the UE. For example, if a UE is being managed by the CU 304, then the UE can change its associations to that of a relay node based on policies enacted by the CU 304.

Figure 8:
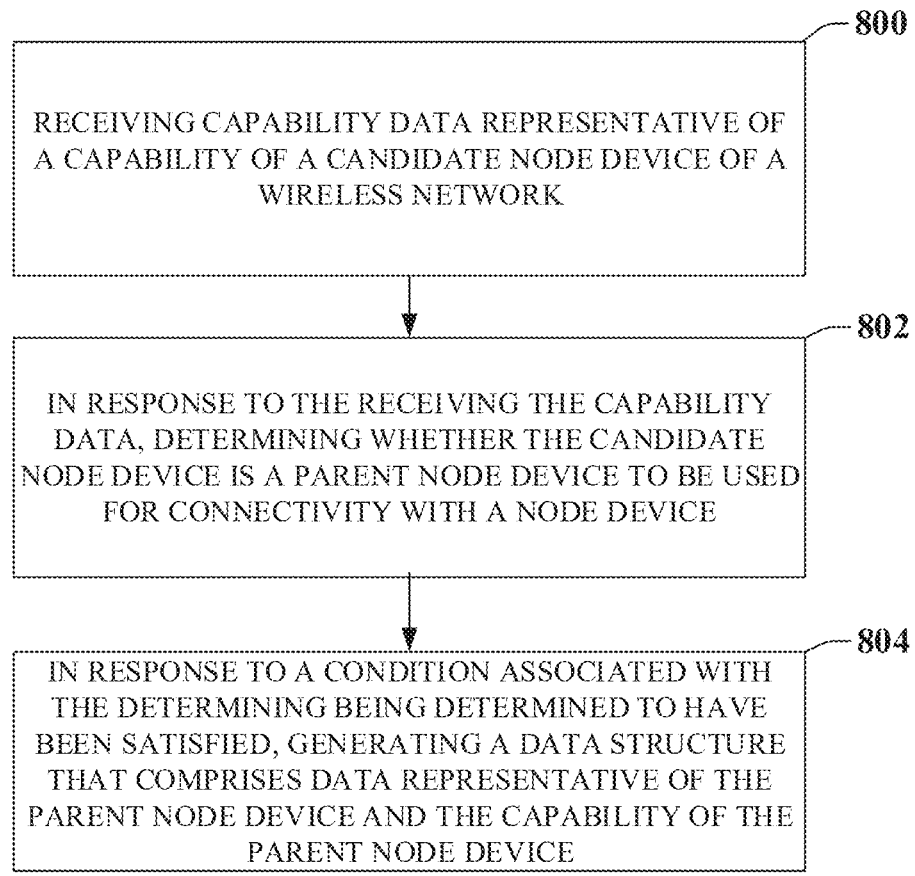
FIG. 8 illustrates an example flow diagram for a method for facilitating user association via a radio access network controller for a 5G network according to one or more embodiments.

Referring now to FIG. 8, illustrated is an example flow diagram for a method for facilitating user association via a radio access network controller for a 5G network according to one or more embodiments.

At element 800, a method can comprise receiving capability data (e.g., from the CU 304) representative of a capability of a candidate node device (e.g., IAB node 604) of a wireless network. In response to the receiving (e.g., by the RC 402) the capability data, at element 802, the method can comprise, determining (e.g., by the RC 402) whether the candidate node device (e.g., IAB node 604) is a parent node device to be used for connectivity with a node device. Additionally, in response to a condition associated with the determining being determined to have been satisfied, at element 804, the method can comprise generating (e.g., by the RC 402) a data structure that comprises data representative of the parent node device and the capability of the parent node device.

Figure 9:
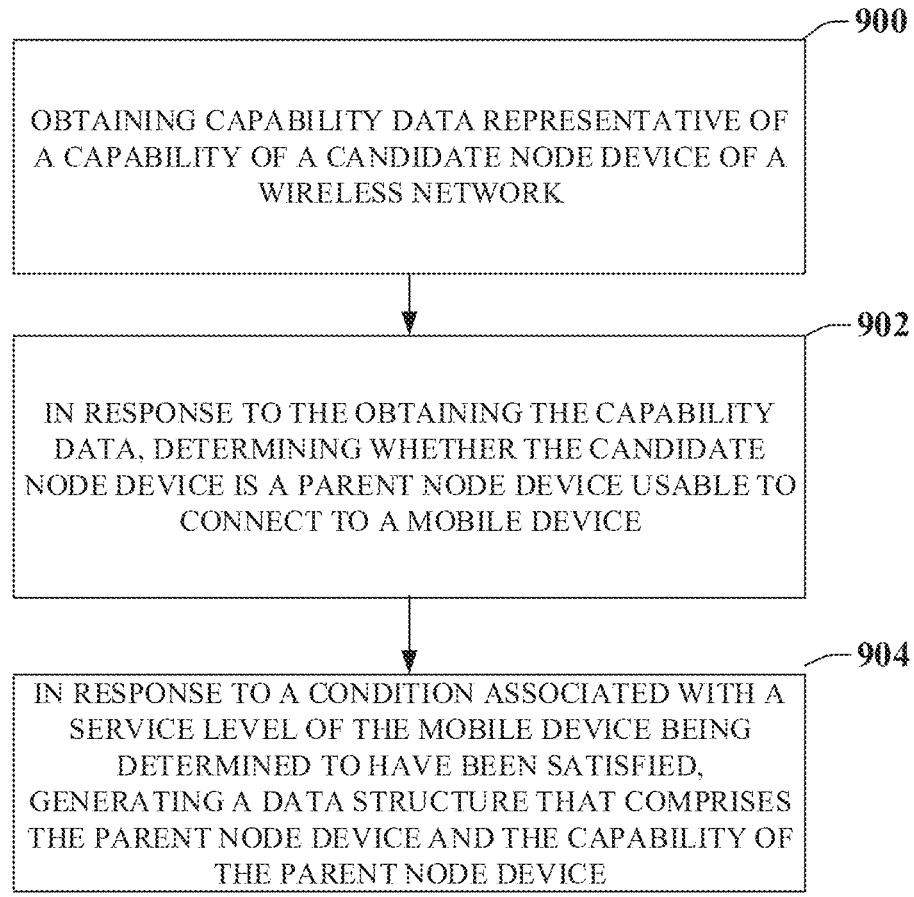
FIG. 9 illustrates an example flow diagram for a system for facilitating user association via a radio access network controller for a 5G network according to one or more embodiments.

Referring now to FIG. 9, illustrates an example flow diagram for a system for facilitating user association via a radio access network controller for a 5G network according to one or more embodiments.

At element 900, a system can facilitate, obtaining capability data (e.g., via the RC 402) representative of a capability of a candidate node device (e.g., IAB node 604) of a wireless network. In response to the obtaining (e.g., by the RC 402) the capability data, at element 902, the system operations can comprise determining (e.g., by the RC 402) whether the candidate node device (e.g., IAB node 604) is a parent node device usable to connect to a mobile device (e.g., UE 102). Furthermore, at element 904, in response to a condition associated with a service level of the mobile device (e.g., UE 102) being determined to have been satisfied, the system operations can comprise generating (e.g., by the RC 402) a data structure that comprises the parent node device and the capability of the parent node device.

Figure 10:
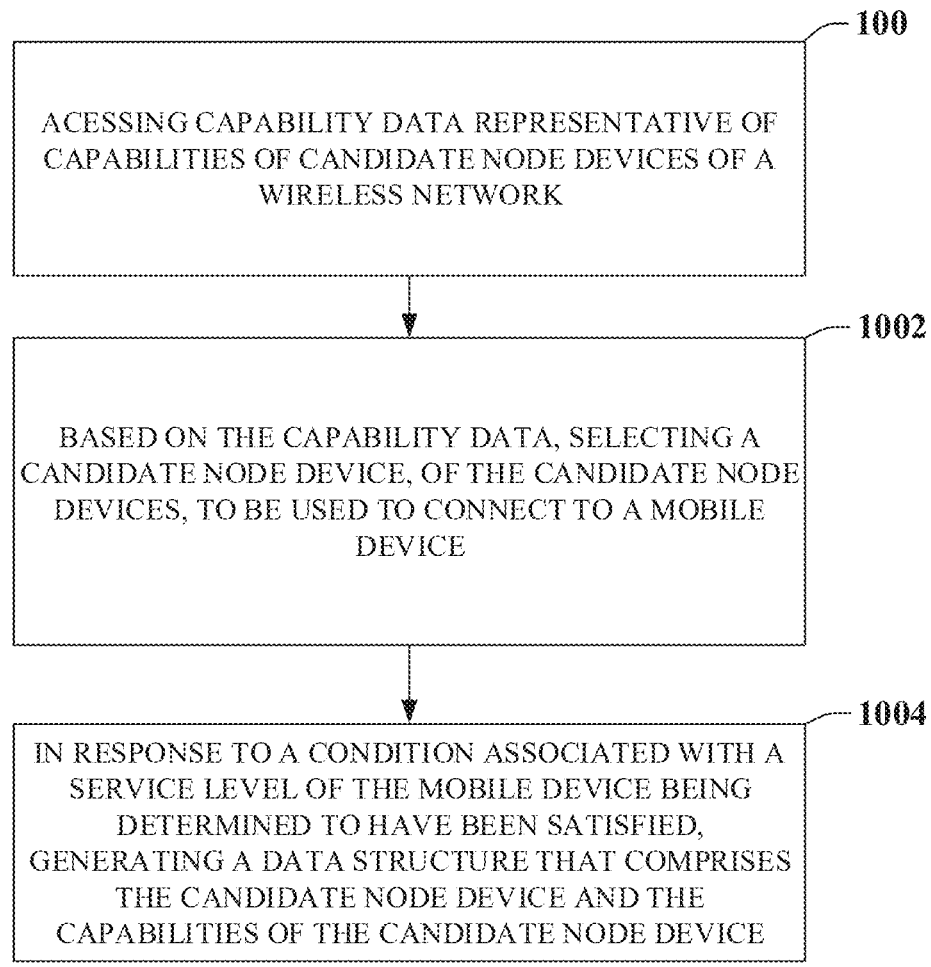
FIG. 10 illustrates an example flow diagram for a machine-readable medium for facilitating user association via a radio access network controller for a 5G network according to one or more embodiments.

Referring now to FIG. 10, illustrated an example flow diagram for a machine-readable medium for facilitating user association via a radio access network controller for a 5G network according to one or more embodiments.

At element 1000, a machine-readable storage medium can perform the operations comprising accessing capability data (e.g., by the RC 402) representative of capabilities of candidate node devices (e.g., IAB node 604) of a wireless network. Based on the capability data, at element 1002, the machine-readable storage medium can perform the operations comprising selecting (e.g., by the RC 402) a candidate node device (e.g., IAB node 604), of the candidate node devices, to be used to connect to a mobile device 102. Furthermore, in response to a condition associated with a service level of the mobile device 102 being determined to have been satisfied, at element 1006, the machine-readable storage medium can perform the operations comprising generating (e.g., by the RC 402) a data structure that comprises the candidate node device (e.g., IAB node 604) and the capabilities of the candidate node device (e.g., IAB node 604).

Figure 11:
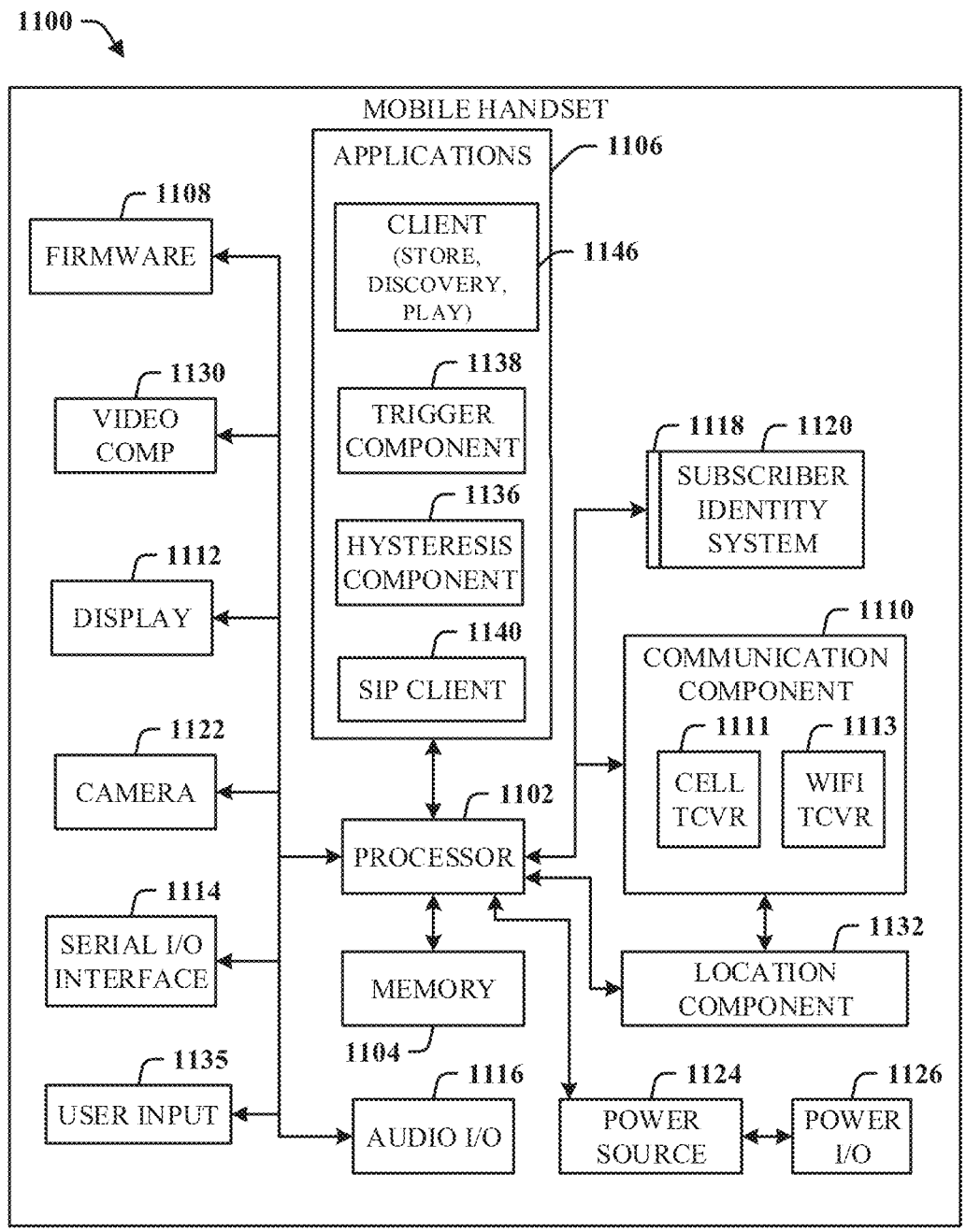
FIG. 11 illustrates an example block diagram of an example mobile handset operable to engage in a system architecture that facilitates secure wireless communication according to one or more embodiments described herein.

Referring now to FIG. 11, illustrated is a schematic block diagram of an exemplary end-user device such as a mobile device 1100 capable of connecting to a network in accordance with some embodiments described herein. Although a mobile handset 1100 is illustrated herein, it will be understood that other devices can be a mobile device, and that the mobile handset 1100 is merely illustrated to provide context for the embodiments of the various embodiments described herein. The following discussion is intended to provide a brief, general description of an example of a suitable environment 1100 in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 1100 includes a processor 1102 for controlling and processing all onboard operations and functions. A memory 1104 interfaces to the processor 1102 for storage of data and one or more applications 1106 (e.g., a video player software, user feedback component software, etc.). Other applications can include voice recognition of predetermined voice commands that facilitate initiation of the user feedback signals. The applications 1106 can be stored in the memory 1104 and/or in a firmware 1108, and executed by the processor 1102 from either or both the memory 1104 or/and the firmware 1108. The firmware 1108 can also store startup code for execution in initializing the handset 1100. A communications component 1110 interfaces to the processor 1102 to facilitate wired/wireless communication with external systems, e.g., cellular networks, VoIP networks, and so on. Here, the communications component 1110 can also include a suitable cellular transceiver 1111 (e.g., a GSM transceiver) and/or an unlicensed transceiver 1113 (e.g., Wi-Fi, WiMax) for corresponding signal communications. The handset 1100 can be a device such as a cellular telephone, a PDA with mobile communications capabilities, and messaging-centric devices. The communications component 1110 also facilitates communications reception from terrestrial radio networks (e.g., broadcast), digital satellite radio networks, and Internet-based radio services networks.

The handset 1100 includes a display 1112 for displaying text, images, video, telephony functions (e.g., a Caller ID function), setup functions, and for user input. For example, the display 1112 can also be referred to as a "screen" that can accommodate the presentation of multimedia content (e.g., music metadata, messages, wallpaper, graphics, etc.). The display 1112 can also display videos and can facilitate the generation, editing and sharing of video quotes. A serial I/O interface 1114 is provided in communication with the processor 1102 to facilitate wired and/or wireless serial communications (e.g., USB, and/or IEEE 1394) through a hardwire connection, and other serial input devices (e.g., a keyboard, keypad, and mouse). This supports updating and troubleshooting the handset 1100, for example. Audio capabilities are provided with an audio I/O component 1116, which can include a speaker for the output of audio signals related to, for example, indication that the user pressed the proper key or key combination to initiate the user feedback signal. The audio I/O component 1116 also facilitates the input of audio signals through a microphone to record data and/or telephony voice data, and for inputting voice signals for telephone conversations.

The handset 1100 can include a slot interface 1118 for accommodating a SIC (Subscriber Identity Component) in the form factor of a card Subscriber Identity Module (SIM) or universal SIM 1120, and interfacing the SIM card 1120 with the processor 1102. However, it is to be appreciated that the SIM card 1120 can be manufactured into the handset 1100, and updated by downloading data and software.

The handset 1100 can process IP data traffic through the communication component 1110 to accommodate IP traffic from an IP network such as, for example, the Internet, a corporate intranet, a home network, a person area network, etc., through an ISP or broadband cable provider. Thus, VoIP traffic can be utilized by the handset 1100 and IP-based multimedia content can be received in either an encoded or decoded format.

A video processing component 1122 (e.g., a camera) can be provided for decoding encoded multimedia content. The video processing component 1122 can aid in facilitating the generation, editing and sharing of video quotes. The handset 1100 also includes a power source 1124 in the form of batteries and/or an AC power subsystem, which power source 1124 can interface to an external power system or charging equipment (not shown) by a power I/O component 1126.

The handset 1100 can also include a video component 1130 for processing video content received and, for recording and transmitting video content. For example, the video component 1130 can facilitate the generation, editing and sharing of video quotes. A location tracking component 1132 facilitates geographically locating the handset 1100. As described hereinabove, this can occur when the user initiates the feedback signal automatically or manually. A user input component 1134 facilitates the user initiating the quality feedback signal. The user input component 1134 can also facilitate the generation, editing and sharing of video quotes. The user input component 1134 can include such conventional input device technologies such as a keypad, keyboard, mouse, stylus pen, and/or touch screen, for example.

Referring again to the applications 1106, a hysteresis component 1136 facilitates the analysis and processing of hysteresis data, which is utilized to determine when to associate with the access point. A software trigger component 1138 can be provided that facilitates triggering of the hysteresis component 1138 when the Wi-Fi transceiver 1113 detects the beacon of the access point. A SIP client 1140 enables the handset 1100 to support SIP protocols and register the subscriber with the SIP registrar server. The applications 1106 can also include a client 1142 that provides at least the capability of discovery, play and store of multimedia content, for example, music.

The handset 1100, as indicated above related to the communications component 1110, includes an indoor network radio transceiver 1113 (e.g., Wi-Fi transceiver). This function supports the indoor radio link, such as IEEE 802.XX, for the dual-mode GSM handset 1100. The handset 1100 can accommodate at least satellite radio services through a handset that can combine wireless voice and digital radio chipsets into a single handheld device.

Figure 12:
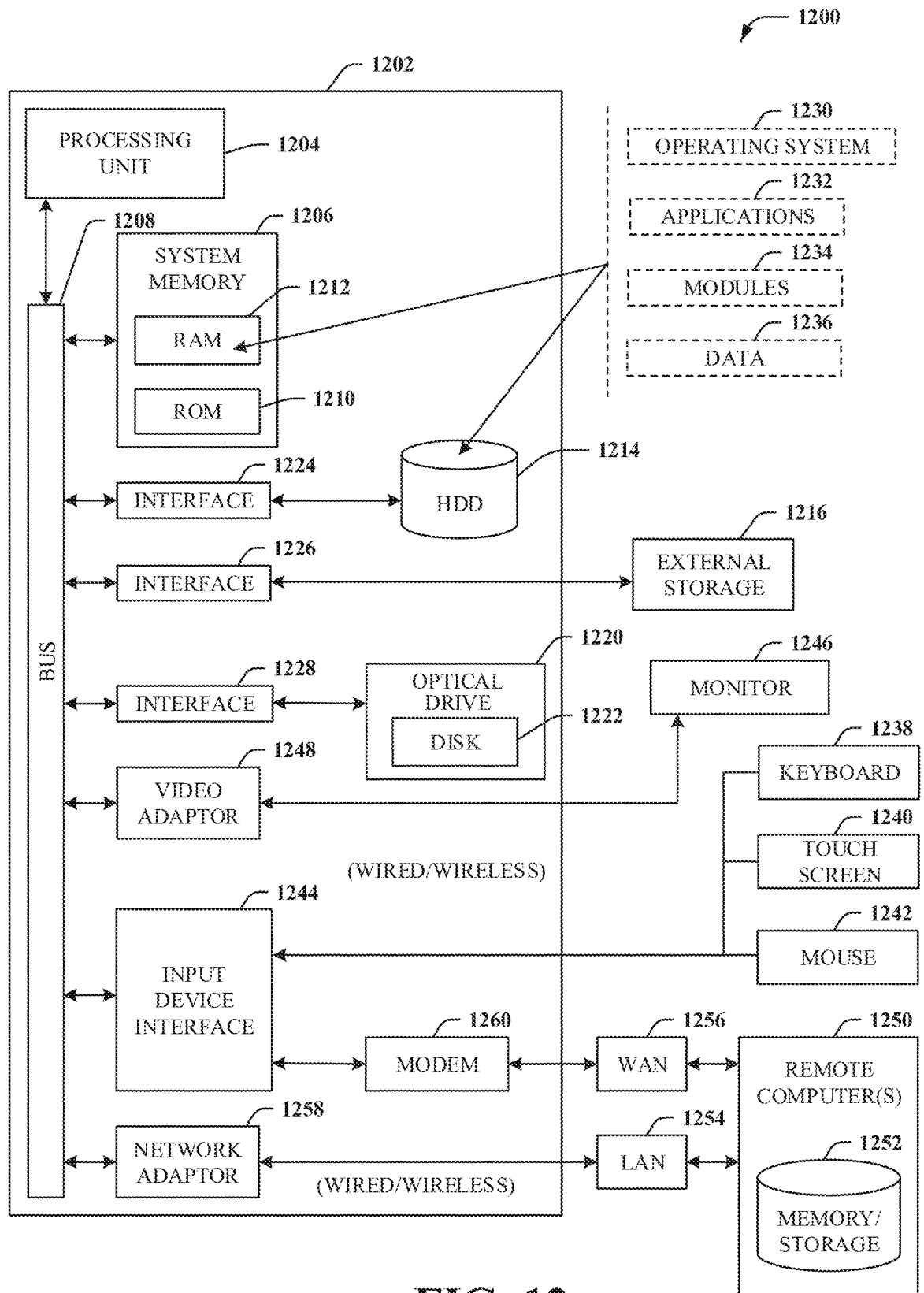
FIG. 12 illustrates an example block diagram of an example computer operable to engage in a system architecture that facilitates secure wireless communication according to one or more embodiments described herein.

In order to provide additional context for various embodiments described herein, FIG. 12 and the following discussion are intended to provide a brief, general description of a suitable computing environment 1200 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 12, the example environment 1200 for implementing various embodiments of the aspects described herein includes a computer 1202, the computer 1202 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi-processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes ROM 1210 and RAM 1212. A basic input/output system (BIOS) can be stored in a non-volatile memory such as ROM, erasable programmable read only memory (EPROM), EEPROM, which BIOS contains the basic routines that help to transfer information between elements within the computer 1202, such as during startup. The RAM 1212 can also include a high-speed RAM such as static RAM for caching data.

The computer 1202 further includes an internal hard disk drive (HDD) 1214 (e.g., EIDE, SATA), one or more external storage devices 1216 (e.g., a magnetic floppy disk drive (FDD) 1216, a memory stick or flash drive reader, a memory card reader, etc.) and an optical disk drive 1220 (e.g., which can read or write from a CD-ROM disc, a DVD, a BD, etc.). While the internal HDD 1214 is illustrated as located within the computer 1202, the internal HDD 1214 can also be configured for external use in a suitable chassis (not shown). Additionally, while not shown in environment 1200, a solid state drive (SSD) could be used in addition to, or in place of, an HDD 1214. The HDD 1214, external storage device(s) 1216 and optical disk drive 1220 can be connected to the system bus 1208 by an HDD interface 1224, an external storage interface 1226 and an optical drive interface 1228, respectively. The interface 1224 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1202, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. The systems and methods described herein can be implemented utilizing various commercially available operating systems or combinations of operating systems.

Computer 1202 can optionally comprise emulation technologies. For example, a hypervisor (not shown) or other intermediary can emulate a hardware environment for operating system 1230, and the emulated hardware can optionally be different from the hardware illustrated in FIG. 12. In such an embodiment, operating system 1230 can comprise one virtual machine (VM) of multiple VMs hosted at computer 1202. Furthermore, operating system 1230 can provide runtime environments, such as the Java runtime environment or the .NET framework, for applications 1232. Runtime environments are consistent execution environments that allow applications 1232 to run on any operating system that includes the runtime environment. Similarly, operating system 1230 can support containers, and applications 1232 can be in the form of containers, which are lightweight, standalone, executable packages of software that include, e.g., code, runtime, system tools, system libraries and settings for an application.

Further, computer 1202 can be enable with a security module, such as a trusted processing module (TPM). For instance with a TPM, boot components hash next in time boot components, and wait for a match of results to secured values, before loading a next boot component. This process can take place at any layer in the code execution stack of computer 1202, e.g., applied at the application execution level or at the operating system (OS) kernel level, thereby enabling security at any level of code execution.

A user can enter commands and information into the computer 1202 through one or more wired/wireless input devices, e.g., a keyboard 1238, a touch screen 1240, and a pointing device, such as a mouse 1242. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1204 through an input device interface 1244 that can be coupled to the system bus 1208, but can be connected by other interfaces, such as a parallel port, an IEEE 1394 serial port, a game port, a USB port, an IR interface, a BLUETOOTH® interface, etc.

A monitor 1246 or other type of display device can be also connected to the system bus 1208 via an interface, such as a video adapter 1248. In addition to the monitor 1246, a computer typically includes other peripheral output devices (not shown), such as speakers, printers, etc.

The computer 1202 can operate in a networked environment using logical connections via wired and/or wireless communications to one or more remote computers, such as a remote computer(s) 1250. The remote computer(s) 1250 can be a workstation, a server computer, a router, a personal computer, portable computer, microprocessor-based entertainment appliance, a peer device or other common network node, and typically includes many or all of the elements described relative to the computer 1202, although, for purposes of brevity, only a memory/storage device 1252 is illustrated. The logical connections depicted include wired/wireless connectivity to a local area network (LAN) 1254 and/or larger networks, e.g., a wide area network (WAN) 1256. Such LAN and WAN networking environments are commonplace in offices and companies, and facilitate enterprise-wide computer networks, such as intranets, all of which can connect to a global communications network, e.g., the Internet.

When used in a LAN networking environment, the computer 1202 can be connected to the local network 1254 through a wired and/or wireless communication network interface or adapter 1258. The adapter 1258 can facilitate wired or wireless communication to the LAN 1254, which can also include a wireless access point (AP) disposed thereon for communicating with the adapter 1258 in a wireless mode.

When used in a WAN networking environment, the computer 1202 can include a modem 1260 or can be connected to a communications server on the WAN 1256 via other means for establishing communications over the WAN 1256, such as by way of the Internet. The modem 1260, which can be internal or external and a wired or wireless device, can be connected to the system bus 1208 via the input device interface 1244. In a networked environment, program modules depicted relative to the computer 1202 or portions thereof, can be stored in the remote memory/storage device 1252. It will be appreciated that the network connections shown are example and other means of establishing a communications link between the computers can be used.

When used in either a LAN or WAN networking environment, the computer 1202 can access cloud storage systems or other network-based storage systems in addition to, or in place of, external storage devices 1216 as described above. Generally, a connection between the computer 1202 and a cloud storage system can be established over a LAN 1254 or WAN 1256 e.g., by the adapter 1258 or modem 1260, respectively. Upon connecting the computer 1202 to an associated cloud storage system, the external storage interface 1226 can, with the aid of the adapter 1258 and/or modem 1260, manage storage provided by the cloud storage system as it would other types of external storage. For instance, the external storage interface 1226 can be configured to provide access to cloud storage sources as if those sources were physically connected to the computer 1202.

The computer 1202 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding FIGs, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
receiving, by a processing system of a radio access network controller device, the processing system comprising a processor, capability data representative of respective capabilities of a group of candidate node devices;
selecting, by the processing system based on the capability data, a sub-group of candidate node devices of the group of candidate node devices that is able to be used as a parent node device for connectivity of a node device to a network, wherein each candidate node device of the sub-group of candidate node devices has associated therewith a number of hops between the sub-group of candidate node devices and the node device, the respective number of hops forming a selection set;
generating, by the processing system, a data structure that comprises policy data representative of a policy for selection of the parent node device from the sub-group of candidate node devices based on a service level of the node device, and comprises the respective capabilities of the sub-group of candidate node devices, wherein the policy specifies that:
in response to determining that the service level of the node device comprises an ultra-reliable low-latency communication service, biasing the node device towards a first candidate node device of the sub-group of candidate node devices having a least number of the selection set, and
in response to determining that the service level of the node device comprises an enhanced mobile broadband service, biasing the node device towards a second candidate node device of the sub-group of candidate node devices having a greatest number of the selection set; and
sending, by the processing system, the data structure to a central unit device that employs the data structure to provide control signals to the node device to facilitate selection of the parent node device based on the policy.

2. The method of claim 1, wherein the data structure further comprises data representative of the parent node device and capability of the parent node device.

3. The method of claim 1, wherein the capability data comprises respective locations of the group of candidate node devices.

4. The method of claim 1, wherein the data structure further comprises hop order data representative of a hop number order of the sub-group of candidate node devices with respect to the node device.

5. The method of claim 1, further comprising:
sending, by the processing system, the data structure to the node device for use in selecting the parent node device.

6. The method of claim 1, wherein the capability data comprises respective integrated access and backhaul functionality of the group of candidate node devices.

7. The method of claim 1, wherein the capability data comprises respective signal measurement metrics of the group of candidate node devices.

8. A system, comprising:
a processing system including a processor; and
a memory that stores executable instructions that, when executed by the processing system, facilitate performance of operations, comprising:
obtaining capability data representative of respective capabilities of a group of candidate node devices;
selecting, based on the capability data, a sub-group of candidate node devices of the group of candidate node devices that is able to be employed as a parent node device to connect a mobile device to a radio network, wherein each candidate node device of the sub-group of candidate node devices has associated therewith a number of hops between the sub-group of candidate node devices and the mobile device, the respective number of hops forming a selection set;
generating a data structure that comprises policy data representative of a policy for selection of the parent node device from the sub-group of candidate node devices based on a service level of the mobile device, and comprises the respective capabilities of the sub-group of candidate node devices, wherein the policy specifies that:

in response to determining that the service level of the mobile device comprises an ultra-reliable low-latency communication service, biasing the mobile device towards a first candidate node device of the sub-group of candidate node devices having a least number of the selection set, and in response to determining that the service level of the mobile device comprises an enhanced mobile broadband service, biasing the mobile device towards a second candidate node device of the sub-group of candidate node devices having a greatest number of the selection set; and transmitting the data structure to a centralized unit that employs the data structure to provide control signals to the mobile device to facilitate selection of the parent node device based on the policy.

9. The system of claim 8, wherein the data structure further comprises data representative of the parent node device and capability of the parent node device.

10. The system of claim 8, wherein the capability data comprises respective locations of the group of candidate node devices.

11. The system of claim 8, wherein the data structure further comprises hop order data representative of a hop number order of the sub-group of candidate node devices with respect to the mobile device.

12. The system of claim 8, wherein the operations further comprise:
sending the data structure to the mobile device for use in selecting the parent node device.

13. The system of claim 8, wherein the capability data comprises respective integrated access and backhaul functionality of the group of candidate node devices.

14. The system of claim 8, wherein the capability data comprises respective signal measurements of the group of candidate node devices.

15. A non-transitory machine-readable medium, comprising executable instructions that, when executed by a processing system of a radio access network controller device, facilitate performance of operations, comprising:
accessing capability data representative of respective capabilities of candidate node devices of a network;
based on the capability data, selecting a sub-group of candidate node devices of the candidate node devices that is able to be used as a parent node device to connect a user equipment to the network, wherein each candidate node device of the sub-group of candidate node devices has associated therewith a number of hops between the sub-group of candidate node devices and the user equipment, the respective number of hops forming a selection set; and generating a data structure that comprises policy data representative of a policy for selection of the parent node device from the sub-group of candidate node devices based on a service level of the user equipment, and comprises the respective capabilities of the sub-group of candidate node devices, wherein the policy specifies that:
in response to determining that the service level of the user equipment comprises an ultra-reliable low-latency communication service, biasing the user equipment towards a first candidate node device of the sub-group of candidate node devices having a least number of the selection set, and in response to determining that the service level of the user equipment comprises an enhanced mobile broadband service, biasing the user equipment towards a second candidate node device of the sub-group of candidate node devices having a greatest number of the selection set; and communicating the data structure to a central unit device that employs the data structure to provide control signals to the user equipment to facilitate selection of the parent node device based on the policy.

16. The non-transitory machine-readable medium of claim 15, wherein the data structure further comprises data representative of the parent node device and capability of the parent node device.

17. The non-transitory machine-readable medium of claim 15, wherein the capability data comprises respective locations of the candidate node devices.

18. The non-transitory machine-readable medium of claim 15, wherein the data structure further comprises hop order data representative of a hop quantity order of the sub-group of candidate node devices with respect to the user equipment.

19. The non-transitory machine-readable medium of claim 15, wherein the operations further comprise:
communicating the data structure to the user equipment for use in selecting the parent node device.

20. The non-transitory machine-readable medium of claim 15, wherein the capability data comprises respective integrated access and backhaul functionality of the candidate node devices.

* * * * *